(12) United States Patent
Weng et al.

(10) Patent No.: US 6,847,724 B1
(45) Date of Patent: Jan. 25, 2005

(54) ELECTRONIC DEVICE WITH STORABLE EARPHONE

(75) Inventors: Shih-Hsiung Weng, Taipei (TW); Yong-Kong Khor, Penang (MY)

(73) Assignee: Inventec Multimedia & Telecom Corporation, Taipei (TW)

( * ) Notice: Subject to any disclaimer, the term of this patent is extended or adjusted under 35 U.S.C. 154(b) by 0 days.

(21) Appl. No.: 10/724,060

(22) Filed: Dec. 1, 2003

(51) Int. Cl.[7] .............................................. H04R 25/00
(52) U.S. Cl. ..................... 381/370; 381/384; 381/380
(58) Field of Search ................................ 381/309, 370, 381/380, 384, 129, 130, 135; 379/430, 438; 242/385, 400.1, 407; 455/350, 351, 575.1, 575.2, 90.3

(56) References Cited

U.S. PATENT DOCUMENTS

| | | | | |
|---|---|---|---|---|
| 5,339,461 A | * | 8/1994 | Luplow | 455/351 |
| 5,706,353 A | * | 1/1998 | Arai et al. | 381/77 |
| 6,434,249 B1 | * | 8/2002 | Wei | 381/370 |

* cited by examiner

Primary Examiner—Huyen D. Le
(74) Attorney, Agent, or Firm—Bacon & Thomas

(57) ABSTRACT

This invention discloses an electronic device with storable earphone, wherein an earphone cable is wrapped in an earphone strap and a coiler of the electronic device adjusts the extension and contraction of the earphone strap, so that a user may adjust and use the earphone in different environments. When the earphone strap is coiled, the strap is coiled evenly by a guider on the coiler to avoid the jam caused by coiling the strap onto one side of the collector. The structure of the coiler is simple, which makes use of one side of the existing battery compartment of the electronic device for its storage, and thus not occupying additional space in the electronic device.

8 Claims, 5 Drawing Sheets

ELECTRONIC DEVICE WITH STORABLE EARPHONE

BACKGROUND OF THE INVENTION

I. Field of the Invention

This invention relates generally to an electronic device, and more specifically to an electronic device with a storable earphone.

II. Description of the Prior Art

Since the communications in the present so-called e-Century are so fast and people have high demand on information exchange, therefore many portable electronic devices such as music players (portable CD player), Motion Picture Coding Expert Group Audio Layer-3 (MP3) players, mobile phones, and other audio playback products are widely used in different industries, and become indispensable to our daily life.

As to the product application in the present market, most users either using music players or MP3 players have the experience of coiling the cable of their earphone around the player. However, this is not a good way to store earphones, because coiling the cable of the earphone around the player will break the small conductive wire in the cable, and the user may not be able to hear any sound from the earphone. Furthermore, the untidy tangled cable around the player makes the player look bad.

Therefore, it is an important topic for audio player designers and manufacturers to solve the problem and improve the way of combining the earphone cable with the audio player.

SUMMARY OF THE INVENTION

In view of the conventional way of storing the earphone cable, audio products do not comply with the humanistic design, and the users get used to coil the earphone cable around the audio player which causes all kinds of problems, the inventor of this invention based on years of experience on the manufacture of related products to conduct extensive research and experiments and finally invented a simple-structured electronic device with storable earphone in accordance with the present invention.

The primary object of the invention is to provide an electronic device with storable earphone, wherein the earphone cable is wrapped in an earphone strap and the coiler of the electronic device adjusts the extension and contraction of the earphone strap, so that a user may adjust and use the earphone in different environments. When the earphone strap is coiled, the strap is coiled evenly by a guider on the coiler to avoid the jam caused by coiling the strap onto one side of the collector. The structure of the coiler is simple, which makes use of one side of the existing battery compartment of the electronic device for its storage, and thus not occupying additional space in the electronic device.

Another object of the invention is to provide an electronic device with storable earphone, wherein the earphone cable and the earphone strap are combined into one, therefore it is more convenient to use and carry, and the earphone strap is exposed from the top of the electronic device and a soft bag is disposed at the top of the electronic device for storing the earphone, and a buckle is used to buckle the soft bag. The soft bag can help reducing the pressure and discomfort on the user's neck caused by hanging the electronic device on the neck. Further, a door panel is set at the exit of the earphone strap to assure the user's safety on the application. When the door panel is shut, the door panel will press a trigger which will force to stop the whole operation of the coiler.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DESCRIPTION OF THE PREFERRED EMBODIMENT

Figure 1:
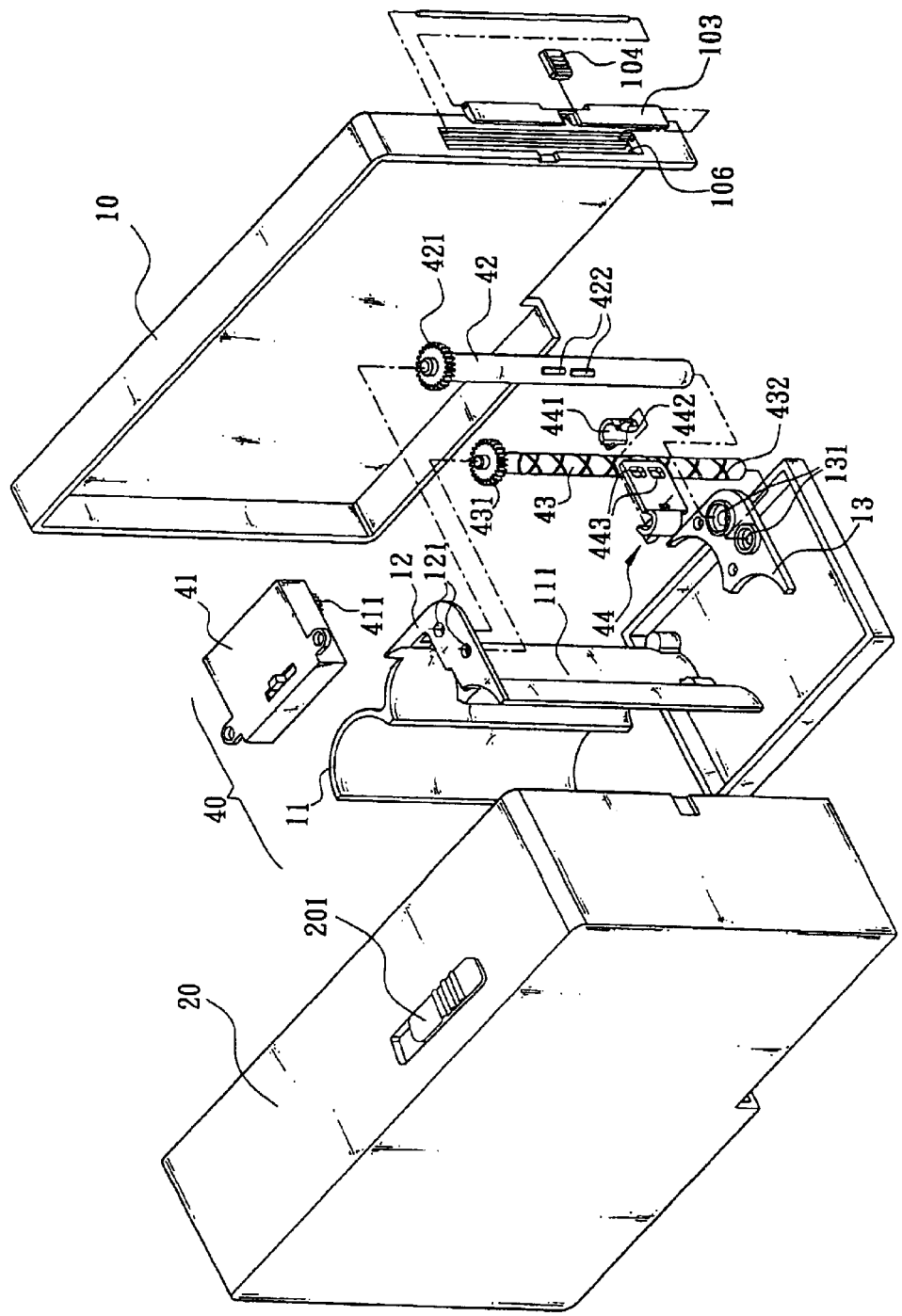
FIG. 1 is a perspective view of the disassembled parts of the structure of the present invention.

In the market, many portable electronic devices such as music players (portable CD player), MP3 players, mobile phones, and other audio products come with an earphone. However, these electronic device manufacturers do not have special design for extending or contracting the earphone cable, such that the user usually coil the earphone around the electronic device when the earphone cable is not in use. However, such arrangement will affect the hearing effect, and the overall appearance will look messy and untidy.

Please refer to FIGS. 1 to 6 for the electronic device with storable earphone according to a preferred embodiment of the present invention. The electronic device could be a music player (portable CD player), a MP3 player, a mobile phone, or other audio products comprising a first casing 10 and a second casing 20; wherein the first casing 10 comprises a coiler 40 of an earphone strap 30 therein, and the coiler 40 is disposed between a battery pillar 111 of a battery compartment 11 and the first casing 10.

Figure 3:
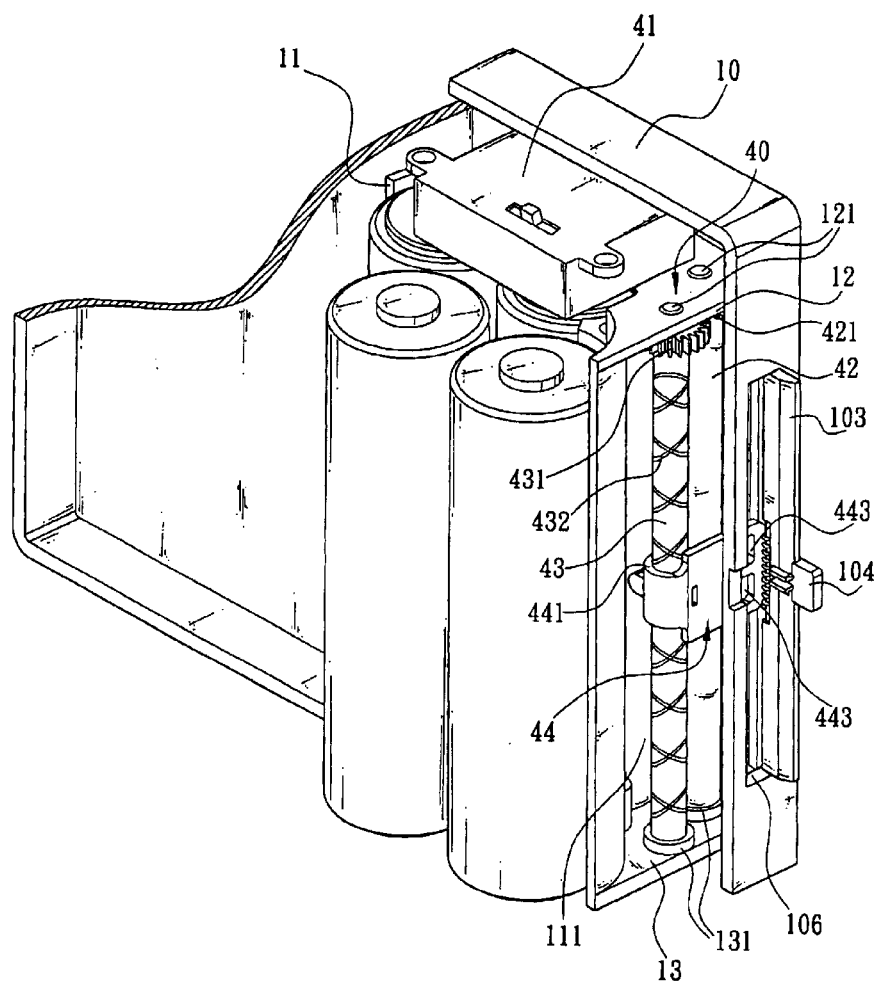
FIG. 3 is an illustrative view of the external appearance of the coiler of the present invention.

The coiler 40 comprises a rotary motor 41 as shown in FIGS. 1 and 3, a gear 411 disposed under the rotary motor 41, and the gear 411 indirectly drives a first gear 421 at one end of a coiling rod 42 and a second gear 431 at one end of a guiding axle 43, such that the coiling rod 42 and the guiding axle 43 rotate accordingly, wherein the gear 411, the first gear 421, and the second gear 431 are mutually engaged and rotate in the same direction.

In this embodiment, a support panel 12 and a bottom panel 13 as shown in FIGS. 1 and 3 are respectively disposed on both ends on one side of the battery compartment 11, and two holed bases 131 are disposed on the bottom panel 13 such that both ends of the coiling rod 42 and the guiding axle 43 are pivotally coupled into the fixed holes 121 and the holed base 131 respectively for the rotation.

Figure 4:
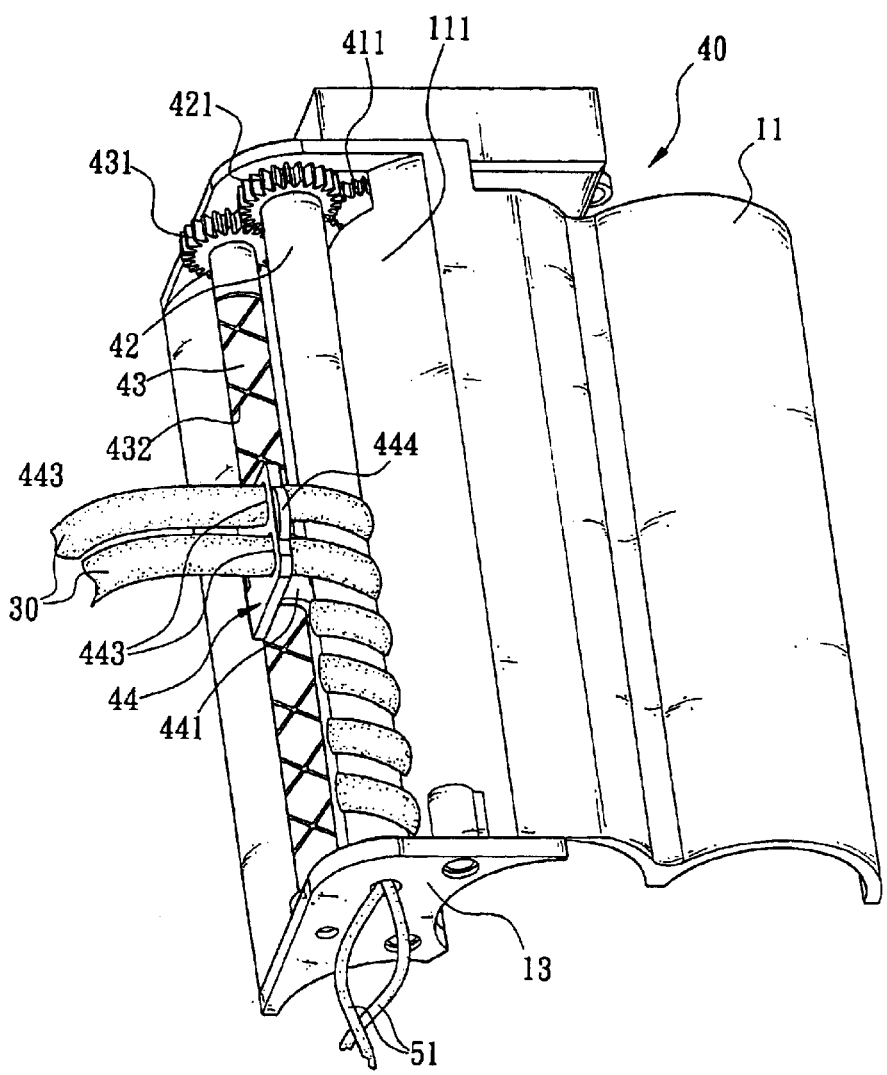
FIG. 4 is another illustrative view of the external appearance of the coiler of the present invention.

In this embodiment, the body of the coiling rod 42 comprises at least one through hole 422 for letting an earphone cable pass through the bottom panel 13 into holed base 131 as shown in FIGS. 1 and 4 and then pass directly through the inside of the coiling rod 42 via the through hole 422 to the outside of the rod body. The exterior of the conductive wire 51 passing out of the rod body is wrapped with an earphone strap 30.

Figure 6:
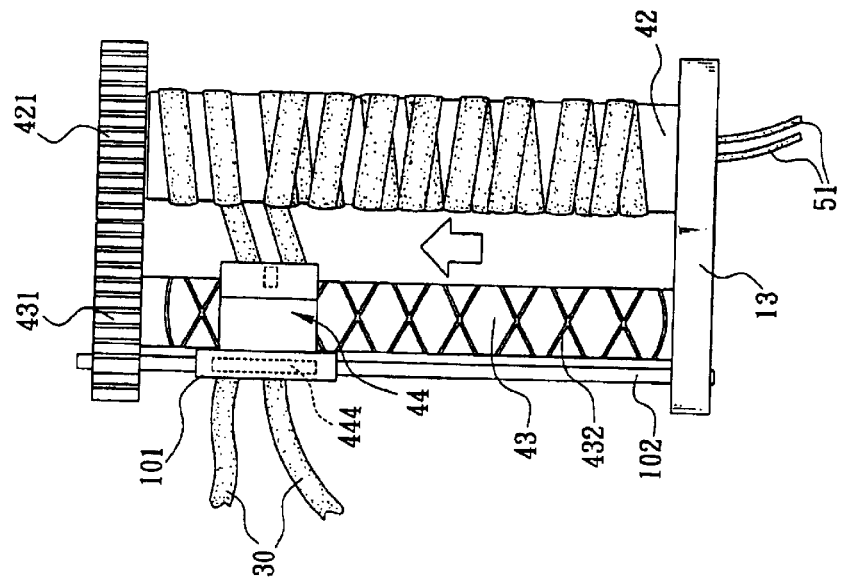
FIG. 6 is another illustrative view of the motion of the coiler of the present invention.
Figure 5:
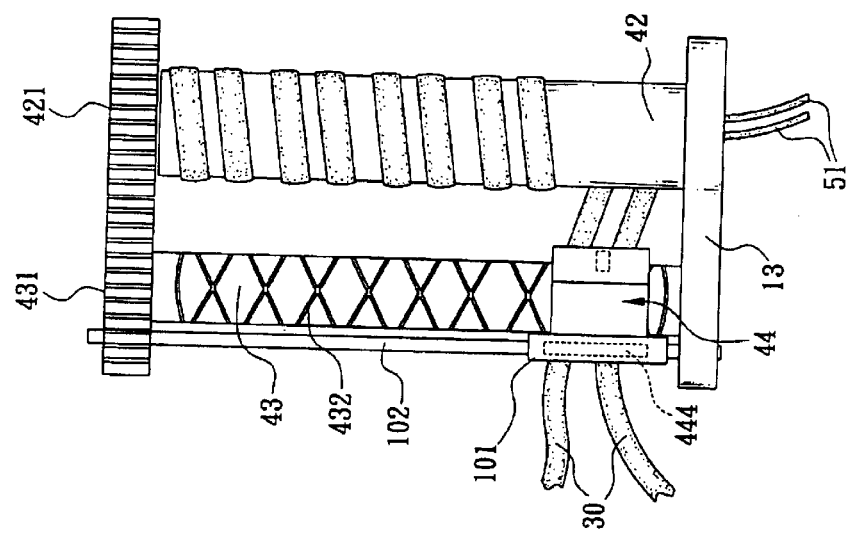
FIG. 5 is an illustrative view of the motion of the coiler of the present invention.

Further, the guiding axle 43 at its surface has a guiding groove 432 as shown in FIGS. 1, 3, and 4 for providing a guiding path for evenly tying the strap 30, and has a guider 44 outside the guiding axle 43. The guider 44 at its end has a covering ring 441 for covering the guiding axle 43, and the covering ring 441 at its interior has a protruded pillar 442 as shown in FIG. 1, which precisely falls into the guiding groove 432. Further, the guider 44 at another end comprises at least a through hole 443 for letting the earphone strap 30 pass through the through hole 422 on the coiling rod 42 into the through hole 443 (as shown in FIGS. 1 and 4), and the other edge 444 of the guider 44 is inserted into a sliding member 101 in the casing 10, and the sliding member 101 can slide vertically along a sliding groove 102 (as shown in FIGS. 5 and 6). When the coiling rod 42 is rotating, the guider 44 can only slide vertically on the guiding axle 43 since the protruded pillar 442 in the covering ring 441 falls into the guiding groove 432. The guiding grooves 432 on the top and bottom ends of the guiding axle 43 are designed to bend backward for changing the moving direction, and it thus allows the strap 30 to be wrapped around the periphery of the rod body along the guiding groove 432 at the top and bottom ends of the coiling rod 42.

In the embodiment, the second casing 20 comprises a control switch 201 (as shown in FIG. 1). The rotary motor 41 can be controlled and turned on, off, or locked respectively by moving the position of the control switch 201. When the control switch 201 is moved to the ON position, the rotary motor 41 is on, and the earphone strap 30 will be coiled and stored. When the control switch 201 is moved to the OFF position, the entire rotary motor 41 will be turned off, and the earphone strap 30 cannot be pulled out or received. When the control switch 201 is moved to the locked position, the gear 411 of the rotary motor 41 is set to the idle state. The earphone strap 30 can be pulled out at this time. When the user pulls it to an appropriate length and moves the control switch 201 to the locked position, the rotary motor 41 will be turned off, and the earphone strap 30 cannot be pulled out or received again.

Figure 2:
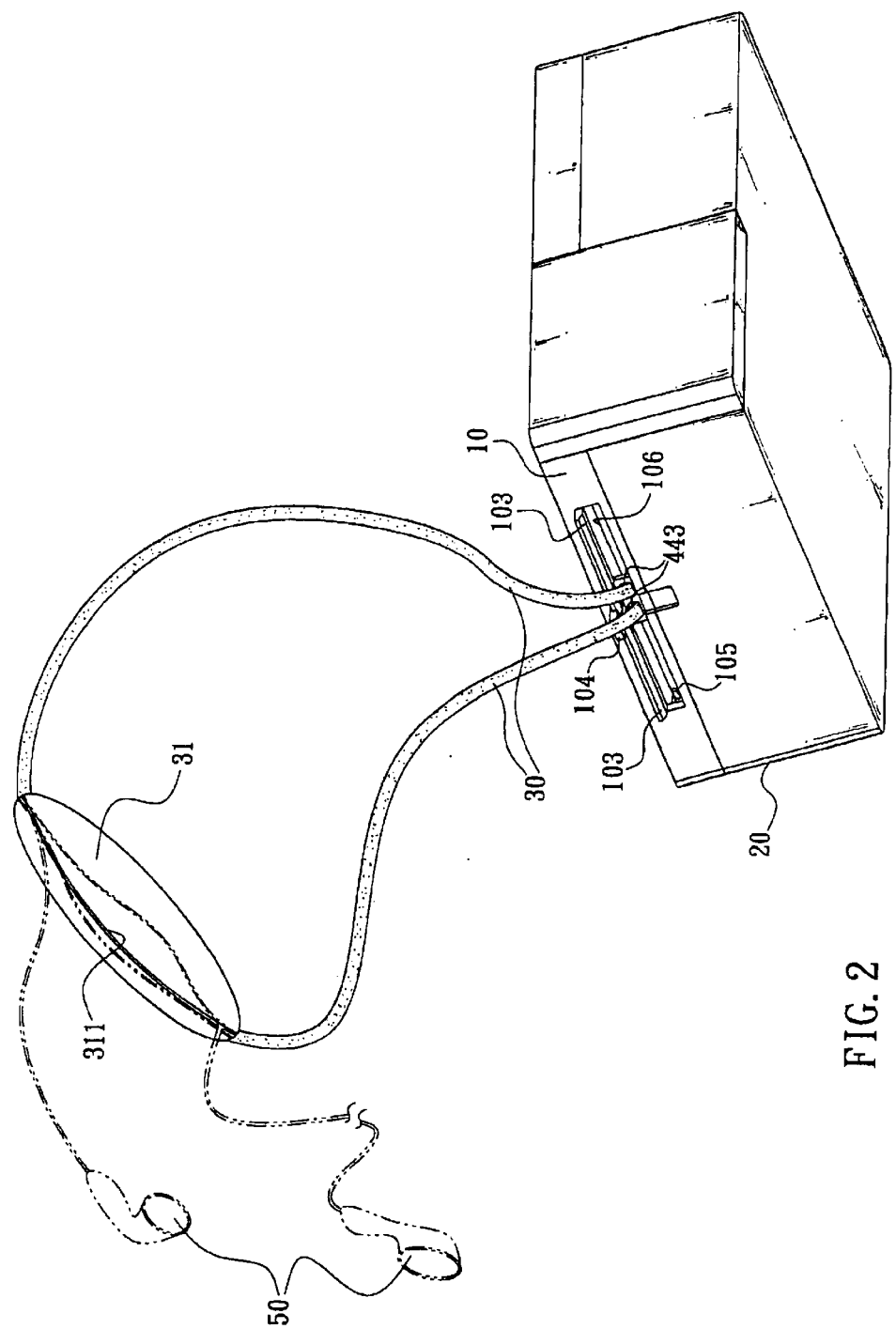
FIG. 2 is an illustrative view of the external appearance of the present invention.

In this embodiment, a door panel 103 (as shown in FIGS. 1, 2, and 3) is disposed at the exit 106 of the earphone strap 30 of the casing 10 to assure the safety on the application and prevent the rotary motor 41 from being affected by gravity and jumping forces. When the user pulls out the earphone strap 30 to the desired length, the door panel 103 will shut the exit 106. The user may lock the door panel 103 with a lock button 104. Such arrangement can prevent the damage to the conductive wire 51 inside the earphone strap 30, and a gap is set between the door panel 103 and the exit 106 such that the door panel 103 will not clip and damage the conductive wire 51. Further, a trigger 105 (as shown in FIG. 2) is disposed on one side of the exit 106 of the casing 10 for being pressed when the door panel 103 is shut, and thus turning off the entire operation of the coiler 40. No matter which position of the control switch 201 is set, the coiler 40 will be forced to stop its operation. Such arrangement can prevent the user to turn on the control switch 201 by mistake for receiving the earphone strap 30 when the door panel 103 has clipped the earphone strap 30.

In this embodiment, the earphone strap 30 exposed outside the top of the casing 10 has a soft bag 31 (as shown in FIG. 2), and the soft bag 31 can store the earphone 50, and a buckle 311 is used to buckle the soft bag 31, so that the earphone strap 30 can be stored tidily, and the earphone 50 will not fall onto the user's neck.

By means of the foregoing components, users may hang the earphone strap 30 on their neck, and put the electronic device in their pocket, hand, or backpack. The earphone strap 30 in accordance with this invention fits different lengths, and the soft bag 31 can reduce the user's pressure and discomfort caused by hanging the electronic device at the neck.

While the invention has been described by means of specific embodiments, numerous modifications and variations could be made thereto by those skilled in the art without departing from the scope and spirit of the invention set forth in the claims.

What is claimed is:

1. An electronic device with storable earphone, comprising:

a first casing, at one side having an exit of an earphone strap;

a coiler, being disposed in said first casing and having a motor and a gear on said motor;

a support panel and a bottom panel, being disposed on both ends of said coiler respectively;

a coiling rod, with both ends being pivotally coupled to said support panel and said bottom panel respectively, and said coiling rod at one end having a first gear engaged with said gear of the coiler and a second gear at one end of a guiding axle, such that when said gear of the coiler being rotated, said coiling rod and said guiding axle being rotated accordingly;

a guider, with one end disposed on said guiding axle, and the other end having at least a through hole;

an earphone strap, being extended out of the body of said coiling rod and passing through the through hole said guider to the outside of the exit of said first casing;

a second casing, being coupled with said first casing for storing said earphone of the electronic device, and having a control switch for control the entire operation of said coiler.

2. The electronic device with storable earphone of claim 1, wherein said coiling rod at its body comprises at least one through hole, and said earphone strap has an earphone conductive wire inside said earphone strap, thereby said earphone conductive wire passes through a hole base on said bottom panel into said coiling rod, and then passes from said through hole out of the rod body, and the section of said conductive wire passing outside the rod body is wrapped with said earphone strap.

3. The electronic device with storable earphone of claim 1, wherein said guider at one end comprises a covering ring for covering said guiding axle, and said covering ring comprises a protruded pillar falling precisely into a guiding groove on the surface of said guiding axle to provide a guiding path for evenly tying said earphone strap of the earphone.

4. The electronic device with storable earphone of claim 3, wherein said guider at another edge is disposed on a sliding member in said first casing, and said sliding member slides vertically along a sliding groove, so that when said coiling rod rotates, said guider slides vertically along said guiding axle since the protruded pillar in the covering ring falls into said guiding groove, and the guiding grooves at the top and bottom ends of said guiding axle are designed to bend backward for changing the traveling direction so that said earphone strap follows the guiding grooves at the top and bottom ends of said coiling rod to be wrapped around the periphery of said coiling rod.

5. The electronic device with storable earphone of claim 1, wherein said casing comprises a door panel disposed at the exit of said earphone strap in said casing, and a lock button disposed on said door panel such that when the length of said earphone strap being exposed outside said exit is long enough, said door panel and said lock button are closed and locked respectively at said exit, and a gap is disposed between said door panel and said exit for preventing said door panel from clipping and damaging the conductive wire of said earphone strap, and a trigger is disposed on one side of said exit for being pressed to trigger and force the coiler to terminate its operation when said door panel is closed.

6. The electronic device with storable earphone of claim 1, wherein said earphone strap with the section exposed from the top of said casing comprises a soft bag for storing said earphone, and a buckle to buckle up said soft bag.

7. The electronic device with storable earphone of claim 1, wherein said coiler is disposed in the gap between said casing and a battery pillar on one side of a battery compartment in said casing, and said support panel and said bottom panel are extended outwardly respectively from both ends on one side of said battery compartment.

8. The electronic device with storable earphone of claim 1, wherein said electronic device is an audio product.

* * * * *